Oct. 27, 1953    F. D. BRADDON    2,656,726
GRAVITATIONAL TORQUING MEANS FOR GYRO INSTRUMENTS
Filed May 16, 1951    2 Sheets-Sheet 1

INVENTOR
FREDERICK D. BRADDON
BY Arthur H. Serrell
his ATTORNEY

Oct. 27, 1953      F. D. BRADDON      2,656,726
GRAVITATIONAL TORQUING MEANS FOR GYRO INSTRUMENTS
Filed May 16, 1951      2 Sheets-Sheet 2

INVENTOR
FREDERICK D. BRADDON
BY Arthur H. Sewell
his ATTORNEY

Patented Oct. 27, 1953

2,656,726

UNITED STATES PATENT OFFICE 2,656,726

GRAVITATIONAL TORQUING MEANS FOR GYRO INSTRUMENTS

Frederick D. Braddon, Babylon, N. Y., assignor to The Sperry Corporation, Great Neck, N. Y., a corporation of Delaware Application May 16, 1951, Serial No. 226,592

10 Claims. (Cl. 74—5.41)

1

This invention relates to a torquing or erecting means in gyro instruments for dirigible craft of the flotation type, in which the provided gravity or horizontal reference is the surface level of a fluid. Gyroscopic devices capable of employing the novel torquing means include instruments of the vertical reference type known in the art as gyro verticals or gyro pendulums.

In known instruments of this character, the gyroscopic element or rotor case supports a gyroscopic rotor adapted to spin about a substantially vertical axis, the element being universally mounted and supported in a pendulous condition to provide the necessary gravitational control. The effect of the gyro in such instruments is to increase the period of the gravitational control or pendulum. This type of pendulous control is not satisfactory for use with dirigible craft unless the pendulosity thereof is made quite large so that the gyroscopic element is able to settle with the required accuracy. Sufficient pendulosity of the gravitational control to attain accuracy imposes a heavy load on the mounting structure or gimbal support for the gyroscopic element and moreover renders the element very sensitive to disturbance due to acceleration with turns of the craft as the gravitational control then tends to align itself with the dynamic instead of the true vertical.

The enumerated conditions are overcome in the improved gyroscopic instrument by supporting the gyroscopic element or rotor case in a condition of neutral flotation by the immersion of the provided float means in the reference defining fluid. The gyroscopic element or case is universally mounted as in conventional instruments but, in this instance, the element is buoyantly supported in a non-pendulous condition with substantially no load due to its weight on the pivots of the universal mounting at any time. Such support for the gyroscopic element is herein termed a condition of neutral flotation. The improved torquing means is effective under conditions of unbalanced immersion of the float means in the reference fluid to cause a righting or erecting moment proportional to the tilt of the element through a limited range.

One of the features of the present invention resides in the provision of a float means fixed to the rotor case of a gyro instrument in symmetrical relation to the respective mounting axes of the case.

Another feature of the invention resides in the provided gravity reference in the form of a receptacle movable with the craft containing a level defining fluid.

2

Other features and structural details of the invention will be apparent from the following description when read in connection with the accompanying drawings, wherein Fig. 1 is a side elevation of a gyro instrument constructed in accordance with the present invention, the mounting frame thereof being shown in vertical section to expose the interior parts;

Figure 1:
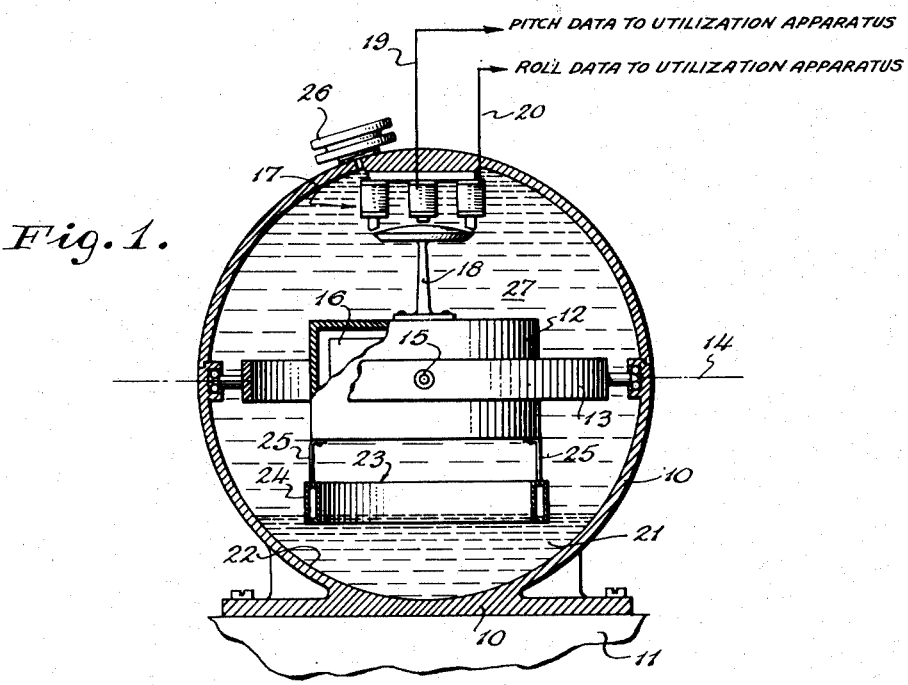
Figure 2:
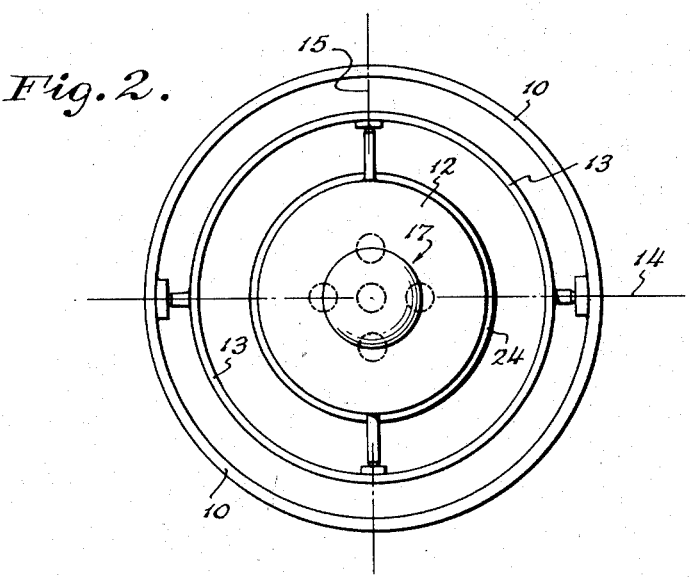
Fig. 2 is a plan view of the instrument shown in Fig. 1.

With reference to Figs. 1 and 2 of the drawings, the mounting frame of the illustrated gyro instrument is indicated at 10. Frame 10 is fixedly connected in a suitable manner in a desired location on a portion 11 of a dirigible craft for which the type of instrument illustrated provides pitch and roll data. As shown, the gyroscopic element or rotor case 12 of the instrument is universally mounted in frame 10 by mounting means in the form of gimbal ring 13. Ring 13 mounts the case 12 with freedom about mutually perpendicular, normally horizontal, major and minor axes respectively designated at 14 and 15. The arrangement of the instrument on the craft may be such that axis 14 is coincident with or parallel to the fore-and-aft axis of the craft and axis 15 is coincident with or parallel to the athwartship axis of the craft. With frame 10 fixed to the craft, any relative tilt between the gyro element or case 12 and frame 10 about axis 14 provides a measure of the departure of the craft from a level condition about its roll or fore-and-aft axis. Also, any relative tilt between element or case 12 and frame 10 about axis 15 provides a measure of the departure of the craft from a level condition about its pitch or athwartship axis. Case 12 includes a gyroscopic rotor designated at 16 mounted therein to spin about a substantially vertical axis. Means of any suitable nature (not herein shown) are provided to spin the gyroscopic rotor 16. The illustrated instrument provides pitch and roll data which as shown in Fig. 1 may be obtained from a suitable electromagnetic transmitter indicated at 17. Transmitter 17 may be of the type designated at 26 in U. S. Letters Patent No. 1,984,874 to R. E. Gillmor et al., issued December 18, 1934. The wound compound stator of transmitter 17 is suitably mounted on frame 10 and the curved armature thereof is connected to the case 12 by a vertical post 18. Lead 19 from the transmitter 17 supplies pitch data to a suitable utilization apparatus. Lead 20 from transmitter 17 supplies roll data to a suitable utilization apparatus.

In accordance with the present invention, the illustrated gyroscopic reference instrument includes a receptacle fixed to or formed by the frame 10 containing a level defining fluid designated at 21, which may be a liquid such as tetra methane. The receptacle for the fluid being fixed to the craft moves therewith when the craft tilts about its pitch and roll axes. The surface of the fluid containing chamber or receptacle portion of the frame 10, as designated at 22 in Fig. 1, may be spherical in shape to minimize any response of the fluid to angular craft movements. The gravitational reference provided for the improved instrument is the horizontal plane defined by the surface of the fluid 21.

The torquing or erecting means for the illustrated instrument, in addition to the fluid 21, includes a float means indicated at 23. In the form of the invention shown in Fig. 1, the level of the fluid 21 is below the bottom of the gyroscopic element or rotor case 12. The float means provided is shown in the form of a hollow annular metal member or ring 24 of rectangular cross section which is connected to the case by a number of spaced mounting struts 25. The struts 25 mount the float means or ring 24 to the case 12 in symmetrical relation to the horizontal major and minor axes 14 and 15 of the case 12. The case 12 and float means or ring 24 are universally mounted in the frame 10 by the gimbal 13 in a condition of neutral equilibrium.

As shown in Fig. 1, the float means 23 is located in a condition of balanced immersion in the fluid 21 with the case properly erected and in a level condition relative to axes 14 and 15. With relative tilt between the case 12 and frame 10 about either or both axes 14, 15, the condition of the float means in the fluid becomes unbalanced and the torquing or erecting means become effective due to the modified buoyancy of the float means. This results in the exertion of a proper erecting torque about either or both of axes 14, 15 to precess the rotor case to an erected condition as determined by the gravity controlled level of the fluid 21. With a float ring of rectangular cross section, as shown, the restoring torque on the rotor case 12 due to the change in buoyancy is substantially proportional to the angle of tilt of the case 12 from a level condition. This linearity continues until the lowered portion of the ring is completely submerged, after which the erecting torque remains substantially constant. The erecting characteristics of a gyroscopic instrument utilizing a float means as herein described depends on the buoyancy of the float ring, as well as its diametral and cross-sectional size and configuration. In operation, for example, with tilt about axis 15 of case 12 relative to frame 10 to the left from a normal vertical condition, the left hand end of ring 24, as viewed in Fig. 1, goes deeper into the fluid 21 and the right hand end of the ring raises correspondingly. Due to the increased buoyancy of the left hand end of the float means at such time, the same is effective to exert a clockwise directed torque about axis 15. This torque results in precession of the rotor case 12 about axis 14 to cause tilt about axis 14 and consequent operation of the flotation torquing means to precess the rotor case 12 about its axis 15. This results in an erection control that spirals the spin axis of the rotor of the rotor case to a substantially vertical erected position.

The float means 23 is sufficiently immersed in the fluid 21 to support the gyroscopic element or case 12 in a condition of neutral flotation with a minimum load on the pivots of gimbal 13 within its designed range of operation. This reduces bearing friction in the universal mounting for the element 12 and minimizes any effect in the instrument due to mass unbalance of the element 12.

In the form of the invention shown in Fig. 1, the fluid receptacle is a closed hollow container filled by the fluid 21 and a second fluid of lower specific gravity 27 which may be a liquid such as "Florolube." The liquids 27 and 21 are non-miscible. Movements of the element 12 due to the improved torquing or erecting means are effectively damped by the fluid 27. Also by the use of the fluid 27, error in the erecting torque due to surface tension, splash and wetting effects in the liquid 21 per se are avoided. In an instrument of the character shown in Fig. 1, the erecting torque with an unbalanced condition of the float means is proportional to the difference in the density of the two fluids. A bellows 26 fixed to the closed frame 10 permits the volume of the fluids to change with changes in temperature.

Figure 3:
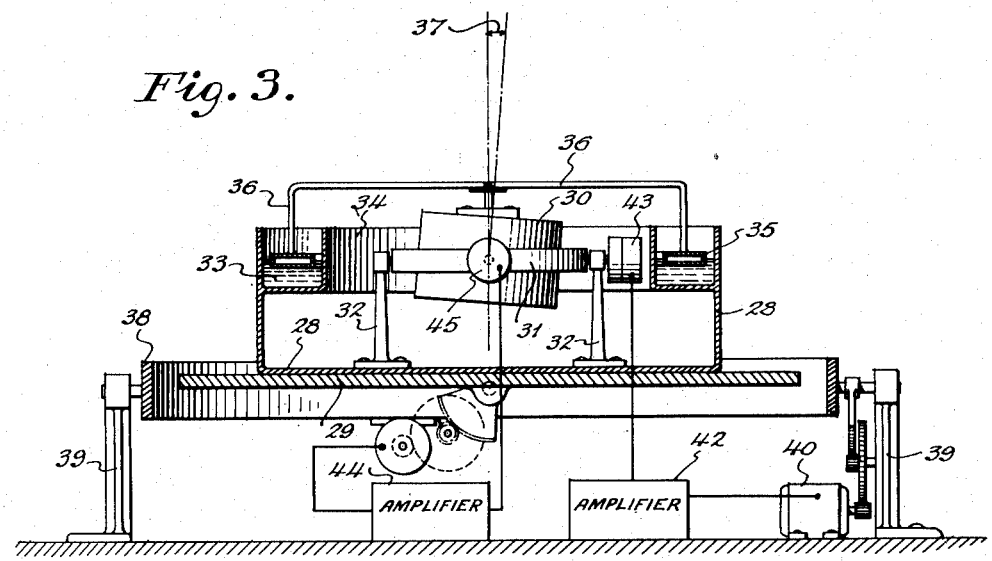
Fig. 3 is a view similar to Fig. 1 showing a modified form of the instrument used in connection with a stable platform.
Figure 4:
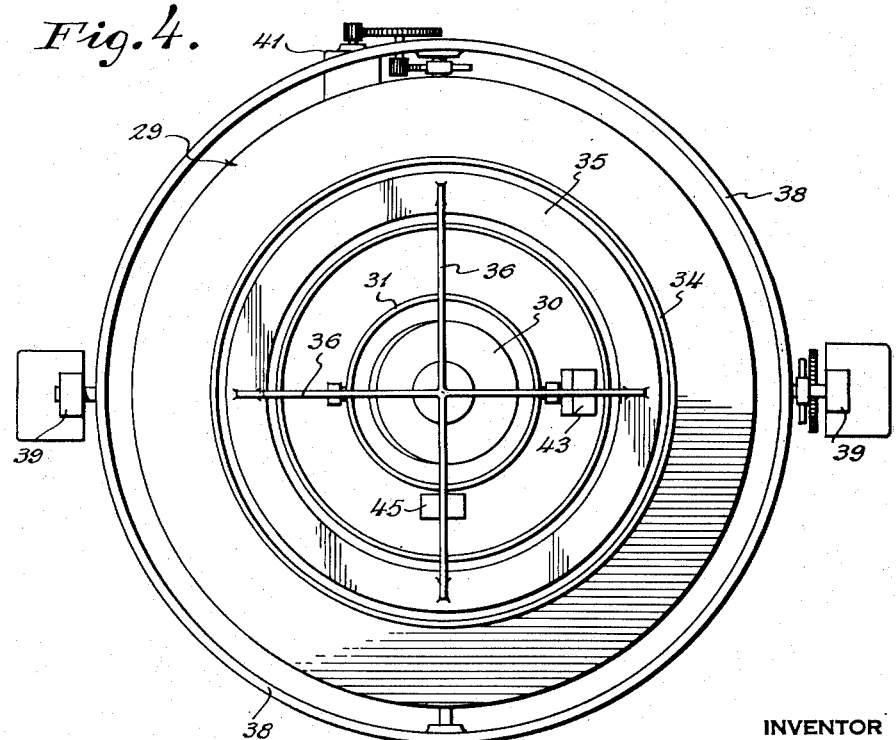
Fig. 4 is a plan view of the device and platform shown in Fig. 3.

In the form of the invention shown in Figs. 3 and 4, the frame 28 is mounted on a platform 29 universally supported on the dirigible craft and the output of the instrument is employed to stabilize the platform. The gyroscopic element or rotor case and gimbal ring of the improved instrument are respectively indicated at 30 and 31. In this instance, the rotor case 30 is universally mounted by the ring 31 on two vertical posts 32 which form a part of the frame 28, the level of the fluid in the receptacle or trough 34 being above the bottom of the rotor case 30. The float means provided as indicated at 35 is similar to the float ring illustrated in Figs. 1 and 2. The float means or ring 35 is situated to cooperate with the fluid 33 above the bottom of the rotor case 30. As shown, struts 36 connect the ring 35 to the top of the rotor case 30. The improved reference instrument may be compensated for error due to turns of the dirigible craft by inclining the substantially vertical spin axis of the rotor of the rotor case forwardly as indicated by the angle 37 in Fig. 3, as more particularly described in my U. S. Letters Patent Re. No. 23,291, issued November 7, 1950. In this arrangement, a single fluid 33 is employed which may be a heavy silicon liquid. The friction in the pivots of gimbal 31 is sufficient to provide proper damping of the movements of element 30 due to the erecting torques exerted about the respective axes of the element.

As shown in Figs. 3 and 4, table 29 is universally supported on the craft by means of gimbal 38 rotatably mounted on posts 39, the major and minor horizontal axes of the platform being respectively arranged parallel to the major and minor axes of the rotor case 30. Stabilization of the platform 29 is obtained by operation of suitable motive means herein shown in the form of electric motors 40 and 41. Motor 40 is connected through suitable gearing to one of the trunnions of ring 38 as shown in Fig. 3, and is operated by the output of a suitable amplifier 42 whose input is derived from a conventional signal pick-off 43 at the roll axis of the instrument. Pick-off 43 provides an output signal with relative tilt of the case 30 and frame 28 about the major axis of support of the case 30. Motor 41 is mounted on the ring 38 and is connected through suitable gearing to one of the minor axis trunnions supporting the platform 29. Motor 41 is operated by the output of a suitable amplifier 44 whose input is derived from a conventional signal pickoff 45 at the pitch axis of the instrument. Pickoff 45 provides an output signal with relative tilt of the case 30 and frame 28 from a normal condition about the minor axis of support of the case 30. By stabilization of the platform and the instrument thereon, any disturbing effects in the fluid reference due to angular movements of the craft are minimized.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro instrument for dirigible craft having a frame mounted on the craft, a non-pendulous gyroscopic element, flotation torquing means including a receptacle tiltable about an axis with the frame containing a horizontal level defining fluid, and float means for the element immersed in said fluid supporting the element buoyantly in a condition of neutral flotation, said torquing means operating with relative tilt between the element and frame to exert a torque about the tilt axis proportional to the tilt through a limited range due to the buoyancy of the float means in a condition of unbalanced immersion in the fluid.

2. A gyro instrument as claimed in claim 1, in which said receptacle is a closed hollow container filled by the level defining fluid and a second fluid of lower specific gravtiy than the level defining fluid, said fluids being non-miscible.

3. In a gyro instrument having a mounting frame, a non-pendulous gyroscopic element, and a universal mounting between said element and frame providing the element with freedom about mutually perpendicular, normally horizontal, major and minor axes; flotation torquing means including a receptacle tiltable with the frame containing a level defining fluid, and float means for the element immersed in said fluid supporting the element buoyantly in the mounting in a condition of neutral flotation, said torquing means operating with relative tilt between the element and frame about said axes to exert a torque about the axes proportional to the tilt through a limited range due to the buoyancy of the float means in a condition of unbalanced immersion in the fluid.

4. A gyro instrument as claimed in claim 3, in which the level of the fluid in the receptacle is below the bottom of the gyroscopic element, and the float means is mounted below the bottom of the element.

5. A gyro instrument as claimed in claim 3, in which the level of the fluid in the receptacle is above the bottom of the gyroscopic element, and the float means is situated above the bottom of the element.

6. A gyro instrument as claimed in claim 3, in which said float means is a hollow annular member having a rectangular cross-section.

7. A gyro instrument as claimed in claim 3, in which the level of the fluid in the receptacle is below the bottom of the gyroscopic element, and said receptacle is a closed hollow container filled by the level defining fluid and a second fluid of lower specific gravity than the level defining fluid, said fluids being non-miscible.

8. A gyro instrument for dirigible craft having a frame mounted on the craft, a non-pendulous rotor case having a gyroscopic rotor spinning about a substantially vertical axis, a universal mounting between said case and frame providing the case with freedom about mutually perpendicular, normally horizontal, major and minor axes, flotation erecting means for said case including a receptacle movable with the frame containing a level defining fluid, and float means for the case immersed in said fluid supporting the case buoyantly in the mounting in a condition of neutral flotation.

9. An instrument as claimed in claim 8, in which the float means and case are arranged so that the substantially vertical spin axis of the rotor is inclined relative to the vertical to compensate the instrument for error due to turns of the dirigible craft.

10. The combination of, a universally mounted platform, motive means operable to stabilize said platform, a gyro vertical including a frame mounted on said platform, a non-pendulous rotor case having a gyroscopic rotor spinning about a substantially vertical axis, a universal mounting between said case and frame providing the case with freedom about mutually perpendicular normally horizontal, major and minor axes; flotation erecting means for said case including a receptacle movable with the frame containing a level defining fluid, float means for the case immersed in said fluid supporting the case buoyantly in the mounting in a condition of neutral flotation, and signal means responsive to relative tilt of said frame and case about said axes for operating said platform stabilizing motive means.

FREDERICK D. BRADDON.

References Cited in the file of this patent

UNITED STATES PATENTS

| Number | Name | Date |
|---|---|---|
| 1,173,241 | Anschutz-Kaempfe | Feb. 29, 1916 |
| 1,773,172 | Davis | Aug. 19, 1930 |
| 1,866,706 | Henderson | July 12, 1932 |
| 2,044,343 | Angeloni | June 16, 1936 |
| 2,428,925 | Borell | Oct. 14, 1947 |